United States Patent
Park

(10) Patent No.: US 8,648,965 B2
(45) Date of Patent: Feb. 11, 2014

(54) IMAGE SIGNAL PROCESSOR AND METHOD THEREOF

(75) Inventor: Hye-joung Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1278 days.

(21) Appl. No.: 12/015,737

(22) Filed: Jan. 17, 2008

(65) Prior Publication Data

US 2009/0027553 A1 Jan. 29, 2009

(30) Foreign Application Priority Data

Jul. 26, 2007 (KR) .................. 10-2007-0074950

(51) Int. Cl.
- *H04N 3/27* (2006.01)
- *H04N 5/46* (2006.01)
- *H04N 7/00* (2011.01)
- *H04N 11/00* (2006.01)
- *H04N 5/44* (2011.01)

(52) U.S. Cl.
USPC ........... 348/557; 348/553; 348/554; 348/555; 348/558; 348/527; 348/500; 348/501; 348/502; 348/503; 348/504; 348/505; 348/506; 348/507; 348/508

(58) Field of Classification Search
USPC ......... 348/528, 678, 500–508, 527, 539, 553, 348/554, 555, 557, 558
See application file for complete search history.

(56) References Cited

U.S. PATENT DOCUMENTS

| | | | |
|---|---|---|---|
| 6,172,713 B1 * | 1/2001 | Morita | 348/557 |
| 6,373,533 B1 | 4/2002 | Kawabata et al. | |
| 7,443,455 B2 * | 10/2008 | Nave | 348/678 |

FOREIGN PATENT DOCUMENTS

| | | |
|---|---|---|
| JP | 02149091 A | 6/1990 |
| JP | 05176336 A | 7/1993 |
| KR | 1020000065211 A | 11/2000 |
| KR | 100726428 A | 6/2007 |

OTHER PUBLICATIONS

Communication, dated Aug. 19, 2013, issued by the Korean Intellectual Property Office of the Republic of Korea, in counterpart Application No. 10-2007-0074950.

\* cited by examiner

*Primary Examiner* — Pankaj Kumar
*Assistant Examiner* — Alazar Tilahun
(74) *Attorney, Agent, or Firm* — Sughrue Mion, PLLC

(57) ABSTRACT

An image signal processor and a method for processing an image signal thereof are disclosed. When the image signal processor executes an automatic chroma gain control (ACC), the image signal processor adjusts a variable rate of ACC gain according to a size of an input color signal to reduce a time for processing the ACC. Even if a difference between the size of the input color signal and the size of a reference color signal is large, the ACC is rapidly processed. As a result, transient phenomenon disappears from a screen.

15 Claims, 4 Drawing Sheets

IMAGE SIGNAL PROCESSOR AND METHOD THEREOF

CROSS-REFERENCE TO RELATED APPLICATIONS

This application claims priority from Korean Patent Application No. 10-2007-0074950, filed on Jul. 26, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to an image signal processing, and more particularly, to image signal processing in which an input analog image signal is converted into a digital image signal compliant with a system standard.

2. Description of the Related Art

An analog image signal is generally classified into a composite video blanking and Sync (CVBS) signal, a super (S) signal, and a component signal. The CVBS signal combines a luminance (Y) signal and a chrominance (C) signal and is transmitted according to one of a Phase Alternation by Line System (PAL), a National Television System Committee (NTSC), and Sequential Color with Memory (SECAM).

FIG. 1 is a view illustrating a waveform of a related art CVBS signal.

The waveform illustrated in FIG. 1 represents a horizontal line of one frame of an NTSC image signal. The horizontal line comprises a horizontal synchronization signal (H-SYNC), a color burst signal (COLOR BURST), and a color signal (COLOR) corresponding to values of pixels of one horizontal line.

The COLOR BURST is a reference signal added for a demodulation of a color when a color image signal is transmitted, and is often referred to as a "color subcarrier reference signal." The COLOR BURST is transmitted in a horizontal blanking period where there is no COLOR, and is used at a replay side to demodulate the COLOR based on the waveform.

In NTSC, amplitude of a normal COLOR BURST without a distortion is 40 IRE (140 IRE=1 V as that of the H-SYNT), and a period of a normal COLOR BURST is approximately 3.58 MHz.

Most of the image signal processors execute an automatic chroma gain control (ACC) using a COLOR BURST to compensate distortion of an image signal when the size of the image signal is distorted in transmission and reception. That is, the size of a COLOR is adjusted to that of a reference COLOR corresponding a COLOR BURST.

Amplitude of a COLOR BURST in a normal image signal is 40 IRE, but amplitude of COLOR BURST in a distorted image signal is lower or higher than 40 IRE. If the amplitude of the COLOR BURST is lower than a reference level, the amplitude of the COLOR is amplified to meet the reference level of the COLOR corresponding to the amplitude of the normal COLOR BURST. On the other hand, if the amplitude of the COLOR BURST is higher than a reference level, the amplitude of the COLOR is attenuated to attain to the reference level of the COLOR corresponding to the amplitude of the normal COLOR BURST.

When the size of a COLOR is lower or higher than that of a reference COLOR, the process of ACC includes multiplying the size of the COLOR by a difference between the size of the COLOR and the size of the reference COLOR to compensate the distorted COLOR. The ACC gain is the multiplier of the multiplication. The multiplication is reiterated by feedback until the ACC gain converges into 1. Accordingly, if a difference is large between the size of a COLOR of an input CVBS signal and the size of a reference COLOR, the ACC takes long amount of time. As a result, transient phenomenon appears on a screen, or a brightness varies slow, and an image quality is deteriorated.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides an image signal processor which adjusts a variable rate of ACC gain according to distortion of an input color signal, and so compensates rapidly the size of the color signal to enhance an image quality, and a method for processing an image signal thereof.

According to an exemplary aspect of the present invention, there is provided an image signal processor, comprising a controller which changes an adjustment reference for adjusting gain to compensate the size of an input color signal according to the size of the input color signal; and a decoder which decodes the compensated input color signal.

The controller may comprise a detector which detects the size of the input color signal; a comparator which compares the size of the input color signal detected by the detector with the size of a predetermined reference color signal; a filter which changes the adjustment reference according to a result of the comparator, and changes the gain to compensate the size of the input color signal; and a compensator which compensates the size of the input color signal according to the gain changed by the filter.

The filter may comprise an adjustor which adjusts the adjustment reference according to the result of the comparison; and a determiner which determines the gain according to the adjustment reference.

The controller may change the adjustment reference of each of horizontal lines.

If a difference between the size of the input color signal and the size of the reference color signal is large, the controller may increase the adjustment reference.

If a difference between the size of the input color signal and the size of the reference color signal is small, the controller may decrease the adjustment reference.

The controller may change the adjustment reference by varying multiples of a reciprocal of a result of dividing the size of the input color signal by the size of the reference color signal.

According to an exemplary aspect of the present invention, there is provided a method for processing an image signal, comprising changing an adjustment reference for adjusting gain compensating the size of an input color signal according to the size of the input color signal, and compensating the size of the input color signal; and decoding the compensated input color signal.

The compensating may comprise detecting the size of the input color signal; comparing the size of the input color signal detected by the detector with the size of a predetermined reference color signal; changing the adjustment reference, and changing the gain to compensate the size of the input color signal according to a result of the comparator; and compensating the size of the input color signal according to the changed gain.

The changing the gain may comprise adjusting the adjustment reference according to the result of the comparison; and determining the gain according to the adjustment reference.

The compensating may change the adjustment reference of each of horizontal lines.

If a difference between the size of the input color signal and the size of the reference color signal is large, the compensating may increase the adjustment reference.

If a difference between the size of the input color signal and the size of the reference color signal is small, the compensating may decrease the adjustment reference.

The compensating may change the adjustment reference by varying multiples of a reciprocal of a result of dividing the size of the input color signal by the size of the reference color signal.

According to another exemplary aspect of the present invention, there is provided an image signal apparatus, comprising a controller which changes an adjustment reference for adjusting gain to compensate the size of an input color signal according to the size of the input color signal; and a decoder which decodes the compensated input color signal.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE INVENTION

Figure 1:
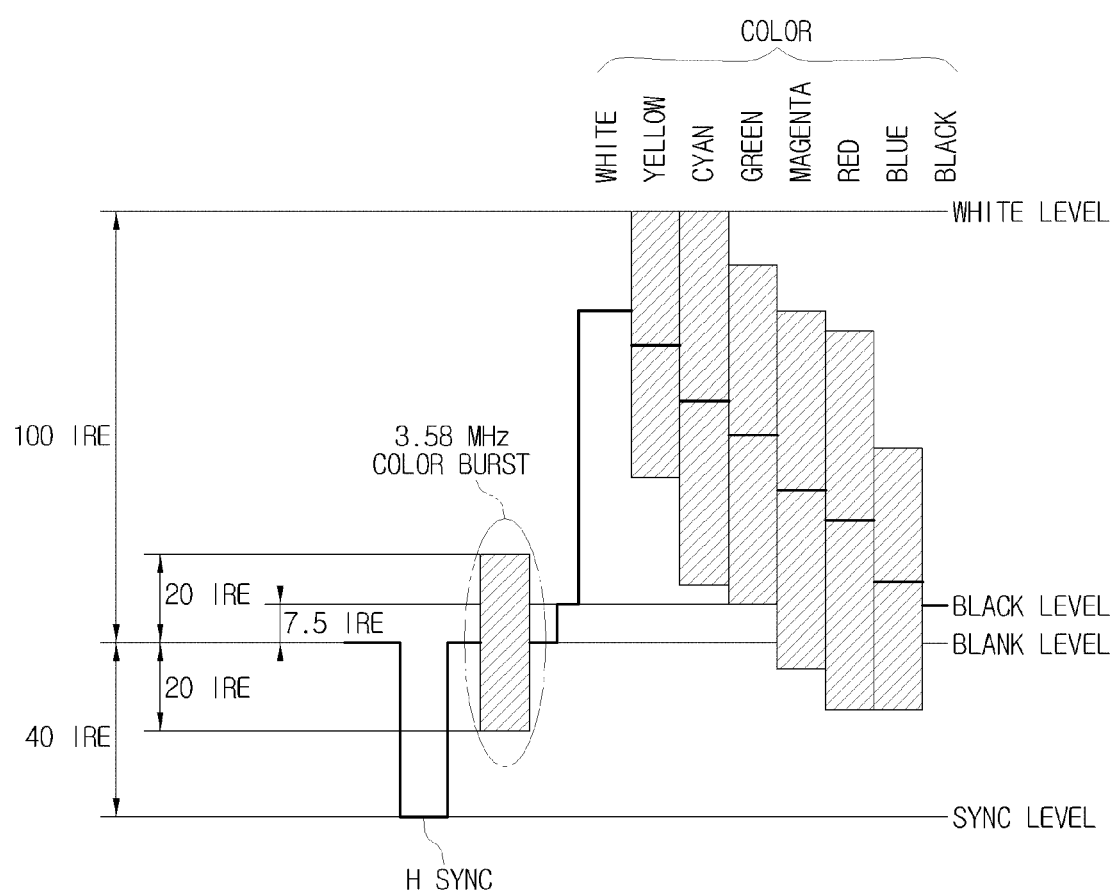
FIG. 1 is a view illustrating a waveform of a related art CVBS signal.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

Figure 2:
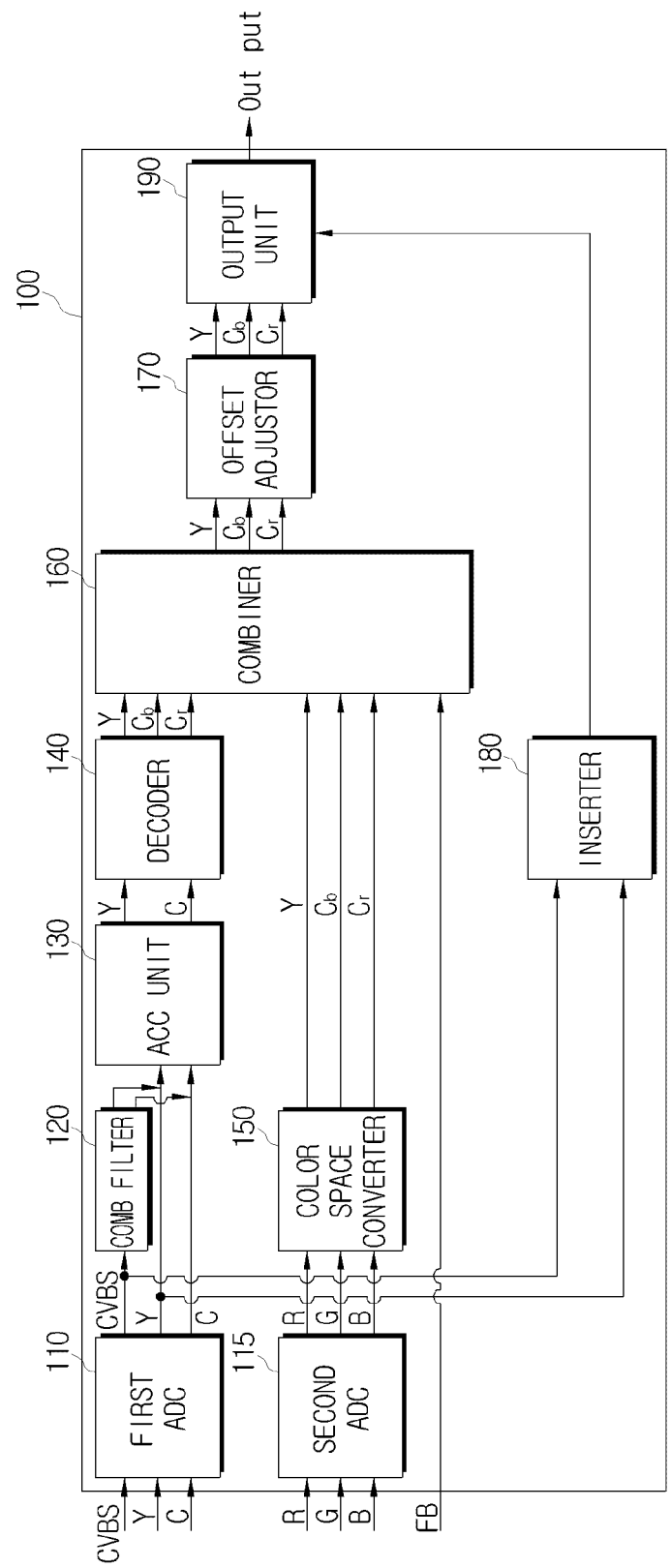
FIG. 2 is a block diagram illustrating an image signal processor according to an exemplary embodiment of the present invention.

FIG. 2 is a block diagram illustrating an image signal processor according to an exemplary embodiment of the present invention.

Referring to FIG. 2, an image signal processor 100 according to an exemplary embodiment of the present invention may comprise a first analog-to-digital converter (ADC) 110, a second ADC 115, a comb filter 120, an ACC unit 130, a decoder 140, a color space converter 150, a combiner 160, an offset adjustor 170, an inserter 180, and an output unit 190.

The first ADC unit 110 and the second ADC unit 115 convert an input analog image signal into a digital image signal, and output the converted signal. That is, the first ADC 110 receives a CVBS signal and luminance and chrominance (Y/C) signals in an analog form, converts the input signals into a digital form of CVBS signal and Y/C signals, and outputs the converted signals. The second ADC 115 receives a red, green, and blue (RGB) signal in an analog form, converts the analog RGB signal into a digital RGB signal, and outputs the converted signal.

The comb filter 120 splits the CVBS signal output from the first ADC 110, and outputs Y/C signals. That is, the comb filter 120 is selectively operated as a two dimensional (2D) comb filter executing a spatial filtering of an image signal or a three dimensional (3D) comb filter executing an temporal filtering of an image signal, to filter the CVBS signal and output Y/C signals.

The ACC unit 130 receives a C signal output from the comb filter 120 or the first ADC 110, adjusts an ACC gain according to a difference between the size of the received C signal and the size of reference color signal, and compensates the size of the C signal to that of the reference color signal. That is, when the differences between the size of the received C signal and the size of the reference color signal in each of the horizontal lines are large, e.g., greater than a reference threshold, the ACC unit 130 increases an adjustment reference. As the ACC gain is changed in the horizontal lines according to the increased adjustment reference, even if the difference is large between the size of the C signal and the size of the reference color signal, the size of the C signal can be rapidly compensated.

The decoder 140 receives Y/C signals output from the ACC unit 130, and outputs the Y/C signals into YCbCr signals. That is, the decoder 140 decodes a C signal corresponding to a color signal (COLOR) into two color difference signals (CbCr), and outputs the decoded signals.

The color space converter 150 converts RGB signals output from the second ADC 115 into YCbCr signals, and outputs the converted signals. The RGB signals are graphic signals input through a scart connector or a D-sub connector having 15 pins.

The combiner 160 combines YCbCr signals output from the decoder 140 with YCbCr signals output from the color space converter 150 according to a fast blanking (FB) signal, and outputs the combined signals.

The offset adjustor 170 adjusts contrast, brightness, and hue of YCbCr signals output from the combiner 160, and outputs the adjusted signals. An adjustment reference of the offset adjustor 170 may be set by a user, or during performing image quality enhancement.

The inserter 180 extracts caption data required by a vertical blanking interval, and transfers the extracted data to the output unit 190. The caption data may include English language caption, and is inserted to a horizontal blanking interval of YCbCr signals output from the offset adjustor 170.

The output unit 190 inserts the caption data to a horizontal blanking interval of YCbCr signals output from the offset adjustor 170 to convert the caption data into 8 bits, 16 bits, or 24 bits of International Telecommunication Union (ITU) format image data required by a system, and outputs the converted data.

Figure 3:
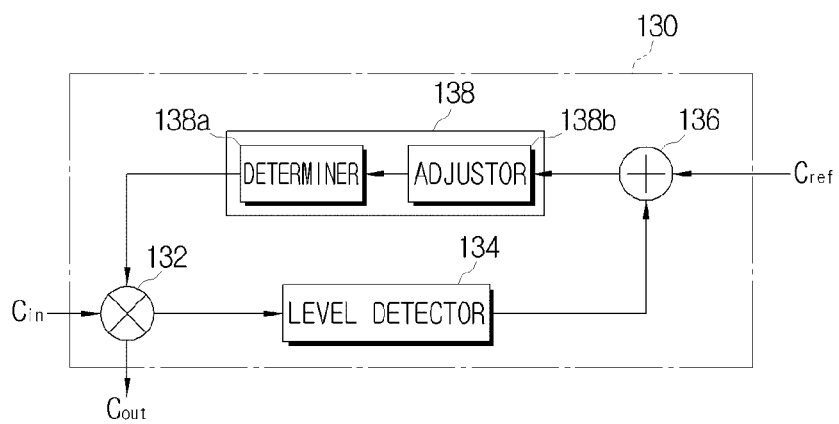
FIG. 3 is a block diagram illustrating an ACC of an image signal processor according to an exemplary embodiment of the present invention.

FIG. 3 is a block diagram illustrating an ACC of an image signal processor according to an exemplary embodiment of the present invention.

Referring to FIG. 3, the ACC unit 130 may comprise a compensator 132, a level detector 134, a comparator 136, and a loop filter 138.

The level detector 134 detects the size of an input COLOR (Cin), and outputs the detected size. That is, the level detector 134 detects a level of a COLOR of one horizontal line, and outputs the detected level.

The comparator 136 compares the size of the COLOR (Cin) output from the level detector 134 with the size of a pre-stored reference COLOR (Cref), and outputs a result of the comparison. That is, the comparator 136 outputs a difference between the size of the input COLOR (Cin) and the size of the reference COLOR (Cref).

The loop filter 138 changes ACC gains of each of the horizontal lines, and outputs the changed ACC gains. The loop filter 138 may include a determiner 138a, and an adjustor 138b.

The adjustor 138b adjusts an adjustment reference for changing ACC gains of the horizontal lines according to a difference output from the comparator 136. That is, when the difference between the size of the input COLOR (Cin) and the size of the reference COLOR (Cref), e.g., less than a reference threshold, the adjustor 138b decreases the adjustment reference, and when the difference between the size of the input COLOR (Cin) and the size of the reference COLOR (Cref) is large, i.e., greater than a reference threshold, the adjustor 138b increases the adjustment reference. The adjustment reference is varied by multiplies of a reciprocal of a result of dividing the size of input COLOR by the size of reference COLOR.

The determiner 138a determines an ACC gain of each horizontal line according to an adjustment reference changed by the adjustor 138b, and outputs the determined ACC gain. In other words, if the adjustment reference is small, the size of ACC gain is slightly changed, and if the adjustment reference is large, the size of ACC gain is significantly changed. That is, if a difference between the size of an input COLOR (Cin) and the size of a reference COLOR (Cref) is small, the determiner 138a changes the adjustment reference to reduce the variation of ACC gains, and if a difference between the size of an input COLOR (Cin) and the size of a reference COLOR (Cref) is large, the determiner 138a changes the adjustment reference to increase the variation of ACC gains.

The loop filter 138 is able to adjust the size of ACC gain according to the size of the input COLOR (Cin), and to output the adjusted size.

The compensator 132 multiplies input COLOR (Cin) by ACC gain to compensate distortion of input COLOR (Cin). That is, compensator 132 multiplies input COLORs (Cin) of the respective horizontal lines by the respective adjusted ACC gains of each of the horizontal lines to output compensated COLORs (Cout). The size of the compensated COLOR (Cout) may correspond to the size of the reference COLOR (Cref).

Figure 4A:
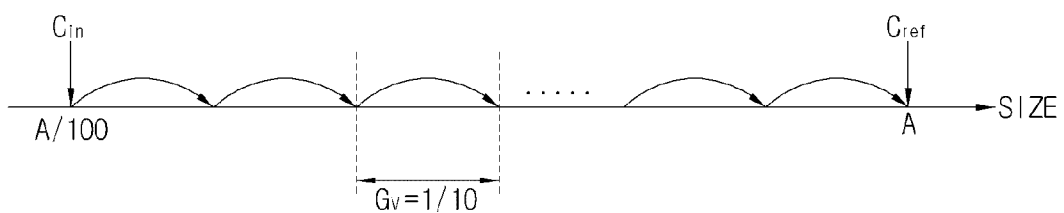
FIGS. 4A and 4B are views illustrating an operation of an ACC unit of an image signal processor according to an exemplary embodiment of the present invention.
Figure 4B:

FIGS. 4A and 4B are views illustrating an operation of an ACC unit of an image signal processor according to an exemplary embodiment of the present invention.

FIG. 4A illustrates an example of an operation of an ACC unit when a difference between the size of input COLOR (Cin) and the size of reference COLOR (Cref) is large, and FIG. 4B illustrates an example of an operation of an ACC unit when a difference between the size of input COLOR (Cin) and the size of reference COLOR (Cref) is small.

Referring to FIG. 4A, if an adjustment reference for adjusting ACC gain is $1/1000$, and the size of an input COLOR (Cin) is $1/100$ of the size of a reference COLOR (Cref), the adjustment reference for adjusting ACC gain is changed by each of $1/10$ times which is 100 times of $1/1000$.

Referring to FIG. 4B, if an adjustment reference for adjusting ACC gain is $1/1000$, and the size of an input COLOR (Cin) is $1/10$ of the size of a reference COLOR (Cref), the adjustment reference for adjustment of ACC gain is changed by each of $1/100$ times which is 10 times $1/1000$.

In other words, when the difference between the size of the input COLOR (Cin) and the size of the reference COLOR (Cref) is large, the adjustment reference for adjusting ACC gain is increased, and when the difference between the size of the input COLOR (Cin) and the size of the reference COLOR (Cref) is small, the adjustment reference for adjusting ACC gain is decreased. As a result, the rate of varying ACC gain can be adjusted according to the size of an input COLOR (Cin), that is, when the difference between the size of the input COLOR (Cin) and the size of the reference COLOR (Cref) is large, the variable rate of ACC gain is increased, and when the difference between the size of the input COLOR (Cin) and the size of the reference COLOR (Cref) is small, the variable rate of ACC gain is decreased.

In the related art image signal processing, when an adjustment reference for adjusting ACC gain is $1/1000$, and the input COLOR (Cin) is $1/100$ of the reference COLOR (Cref), the adjustment reference for adjusting ACC gain is fixed as $1/1000$. Accordingly, a time is required for a cycle of 100000 scanning lines. However, a cycle of 1000 scanning lines is required in the present invention, and so the size of the input COLOR (Cin) can be compensated in a relatively short time.

Figure 5:
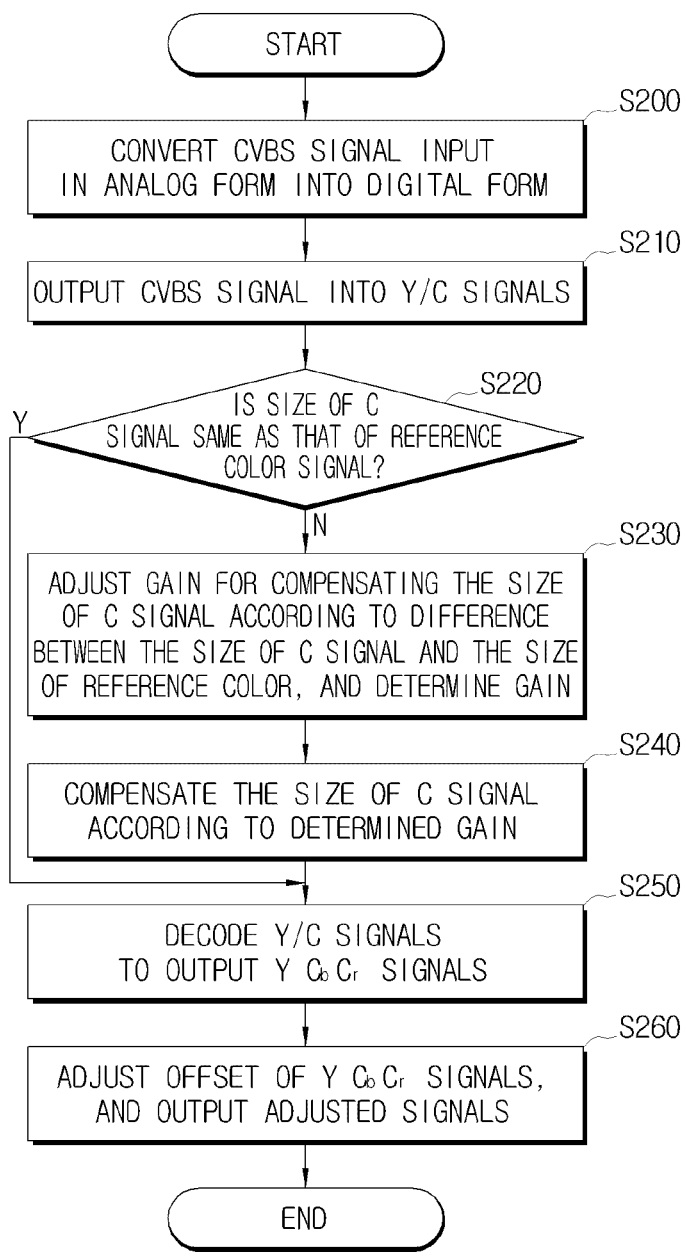
FIG. 5 a flowchart illustrating an operation of an image signal processor according to an exemplary embodiment of the present invention.

FIG. 5 a flowchart illustrating an operation of an image signal processor according to an exemplary embodiment of the present invention.

Referring to FIG. 5, the first ADC 110 converts a CVBS signal input in an analog form into a digital form (S200). The comb filter 120 converts the CVBS signal output from the first ADC 110 into Y/C signals, and outputs the converted signals (S210).

The ACC unit 130 determines whether the size of a C signal is same as that of a reference COLOR (S220). If it is determined that the size of C signal is different from that of the reference COLOR, the ACC unit 130 adjusts ACC gain for compensating the size of the C signal according to a difference between the size of the C signal and the size of the reference COLOR, and determines the ACC gain (S230).

In particular, if the difference between the size of the C signal and the size of the reference color signal is large, the ACC unit 130 increases a variation of the size of ACC gain, and if the difference between the size of the C signal and the size of the reference color signal is small, the ACC unit 130 decreases a variation of the size of ACC gain, to determines the ACC gain.

The ACC unit 130 compensates the size of the C signal according to the determined ACC gain (S240). If the difference between the size of the C signal and the size of the reference COLOR is large, the size of the C signal is capable of being compensated without consuming long time as the related art image signal processing. That, if the difference between the size of the C signal and the size of the reference COLOR is large, the variation of the ACC gain is large, so that the number of reiterated variations until the ACC gain convergence into 1 is reduced. Therefore, the time for compensating the size of the C signal is reduced.

The decoder 140 decodes the Y/C signals compensated by the ACC unit 130 to output YCbCr signals (S250), and the offset adjustor 170 adjusts an offset of the YCbCr signals, and outputs the adjusted signals (S260). If it is determined that the size of the C signal in the process of S220 is same as that of the reference COLOR, the Y/C signals are decoded into YCbCr signals without processing the ACC, the offset of the YCbCr signals is adjusted, and the adjusted signals are output.

As doing so, the time for compensating distortion of an input COLOR may be adjusted according to the size of the input COLOR. The image signal processor 100 according to an exemplary embodiment of the present invention may be employed in an image apparatus such as a television (TV) and a settop box.

As illustrated above, an adjustment reference for adjusting gain is changed to compensate the size of an input COLOR. Accordingly, the time required for processing an ACC according to the size of the input COLOR can be reduced, and a transient phenomenon is prevented form a screen, so that an image quality can be enhanced.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image signal processor comprising:
   a controller which changes an adjustment reference for adjusting a gain to compensate a size of an input color signal according to a difference between the size of the input color signal and a size of a reference color signal; and
   a decoder which decodes the compensated input color signal,
   wherein if the difference between the size of the input color signal and the size of the reference color signal is greater than a reference threshold, the controller increases the adjustment reference, and if the difference between the size of the input color signal and the size of the reference color signal is less than the reference threshold, the controller decreases the adjustment reference.

2. The image signal processor of claim 1, wherein the controller comprises:
   a detector which detects the size of the input color signal;
   a comparator which compares the size of the input color signal detected by the detector with the size of the reference color signal;
   a filter which changes the adjustment reference according to a result of the comparison by the comparator, and changes the gain to compensate the size of the input color signal; and
   a compensator which compensates the size of the input color signal according to the gain changed by the filter.

3. The image signal processor of claim 2, wherein the filter comprises:
   an adjustor which adjusts the adjustment reference according to the result of the comparison by the comparator; and
   a determiner which determines the gain according to the adjustment reference.

4. The image signal processor of claim 1, wherein the controller changes the adjustment reference of each of horizontal lines.

5. The image signal processor of claim 2, wherein the controller changes the adjustment reference by varying multiples of a reciprocal of a result of dividing the size of the input color signal by the size of the reference color signal.

6. A method for processing an image signal, the method comprising:
   changing an adjustment reference for adjusting a gain to compensate a size of an input color signal according to a difference between the size of the input color signal and a size of a reference color signal;
   compensating the size of the input color signal; and
   decoding the compensated input color signal,
   wherein if the difference between the size of the input color signal and the size of the reference color signal is greater than a reference threshold, the compensating increases the adjustment reference, and if the difference between the size of the input color signal and the size of the reference color signal is less than the reference threshold, the compensating decreases the adjustment reference.

7. The method of claim 6, wherein the compensating comprises:
   detecting the size of the input color signal;
   comparing the size of the input color signal detected by the detector with the size of the reference color signal;
   changing the adjustment reference, and changing the gain to compensate the size of the input color signal according to a result of the comparing; and
   compensating the size of the input color signal according to the changed gain.

8. The method of claim 7, wherein the changing the gain comprises:
   adjusting the adjustment reference according to the result of the comparing; and
   determining the gain according to the adjustment reference.

9. The method of claim 6, wherein the compensating changes the adjustment reference of each of horizontal lines.

10. The method of claim 7, wherein the compensating changes the adjustment reference by varying multiples of a reciprocal of a result of dividing the size of the input color signal by the size of the reference color signal.

11. An image signal apparatus comprising:
    a controller which changes an adjustment reference for adjusting a gain to compensate a size of an input color signal according to a difference between the size of the input color signal and a size of a reference color signal; and
    a decoder which decodes the compensated input color signal,
    wherein if the difference between the size of the input color signal and the size of the reference color signal is greater than a reference threshold, the controller increases the adjustment reference, and if the difference between the size of the input color signal and the size of the reference color signal is less the a reference threshold, the controller decreases the adjustment reference.

12. The image signal apparatus of claim 11, wherein the controller comprises:
    a detector which detects the size of the input color signal;
    a comparator which compares the size of the input color signal detected by the detector with the size of the reference color signal;
    a filter which changes the adjustment reference according to a result of the comparison by the comparator, and changes the gain to compensate the size of the input color signal; and
    a compensator which compensates the size of the input color signal according to the gain changed by the filter.

13. The image signal apparatus of claim 12, wherein the filter comprises:

an adjustor which adjusts the adjustment reference according to the result of the comparison by the comparator; and a determiner which determines the gain according to the adjustment reference.

14. The image signal apparatus of claim 11, wherein the controller changes the adjustment reference of each of horizontal lines.

15. The image signal processor of claim 12, wherein the controller changes the adjustment reference by varying multiples of a reciprocal of a result of dividing the size of the input color signal by the size of the reference color signal.

* * * * *